COGSWELL & WILLIAMS.
Grain Drier.
No. 1,377. Reissued Jan. 6, 1863.
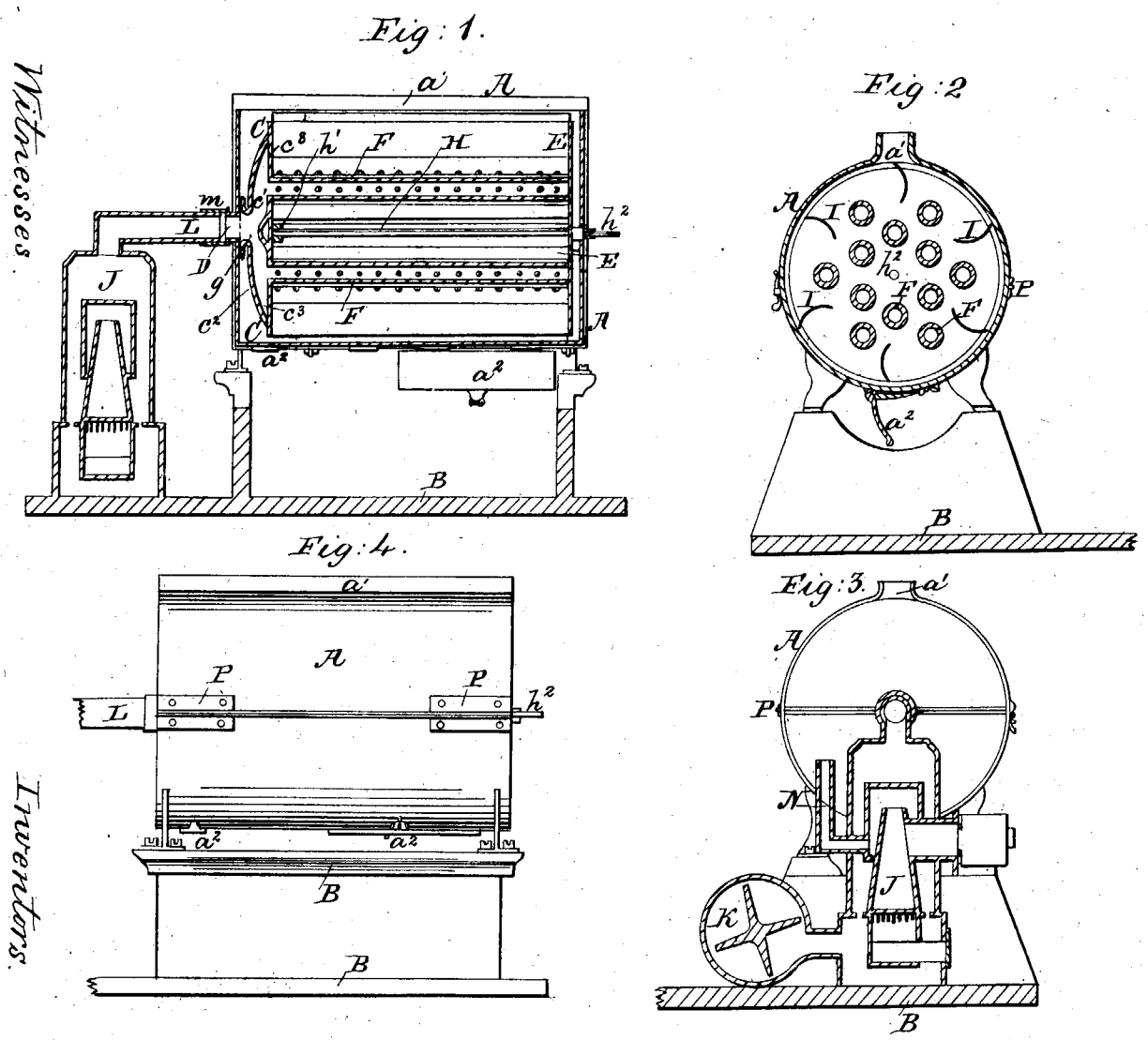
Witnesses.
E. B. Forbush
E. Stone
Inventors.
Addison G. Williams
Mortimer C. Cogswell
N. PETERS, Photo-Lithographer, Washington, D. C.

UNITED STATES PATENT OFFICE.

MORTIMER C. COGSWELL AND ADDISON G. WILLIAMS, OF BUFFALO, N. Y.

IMPROVEMENT IN GRAIN-DRIERS.

Specification forming part of Letters Patent No. 34,405, dated February 18, 1862; Reissue No. 1,377, dated January 6, 1863.

DIVISION NO. 2.

*To all whom it may concern:*

Be it known that we, MORTIMER C. COGSWELL and ADDISON G. WILLIAMS, of the city of Buffalo and State of New York, have invented a new and useful Improvement in Grain-Driers; and we do hereby declare that the following is a full, clear, and exact description thereof, reference being had to the accompanying drawings, making a part of this specification, in which—

Figure I is a longitudinal section of the drier and a vertical section of a furnace connected therewith. Fig. II is a transverse section of the drier. Fig. III is a vertical section of a furnace and blower in connection with an end elevation of the drier. Fig. IV is a longitudinal elevation of the external case or shell into which the grain is admitted and subjected to a blast of air for drying.

The nature of this invention relates to the construction and use of a double head having a hollow journal and an air-chamber for admitting air (either cold or hot) into a grain-drying machine.

Letters of like name and kind refer to like parts in each of the figures.

A represents a stationary cylindrical case or shell, into which the grain is admitted for drying. It is supported upon a suitable frame or foundation, as shown at B. This case is made of metal. Heavy sheet-iron with suitable supporting-ribs will answer the purpose, or "boiler-iron" may be used. It is made with a slit or opening at the top, as shown at $a'$, which runs the whole length of the case and is for the purpose of allowing the moisture, evaporation, dust, &c., which rise during the drying process to freely escape. The grain to be dried is spouted in through this slit at the head or highest end of the cylinder or case. At the bottom of the case are several valves or doors, as shown at $a^2$, for the discharge of the grain when sufficiently dried. When short portable cases are used, these valves will all be kept closed, so as to retain the grain in the case until sufficiently dry, and then the valves are opened and the grain discharged. When the cases are made fifteen or more feet in length, then the valves will all remain closed, except the one at the lower end, which will remain open, so that the grain may pass out in a continual stream. The grain becomes sufficiently dry in its passage through the case. The case is set upon a slight incline—say an eighth or a quarter of an inch to the foot, which will be sufficient to give the grain a tendency to work from the end where it is let in to the opposite end, where it is let out. This case may be made of any desirable length from fifteen to fifty feet, and from three to six feet in diameter.

In a grain drying machine we have ascertained from experience that it is of great importance to keep the grain in the drying-cylinders not only in motion, but in such motion as will cause the grain to fall in showers through more or less air-space; and in order to admit the air into the case while the grain is subjected to the movements described we have devised what we call a "double head," which is represented at C. This head is so constructed as to form a hollow journal, as shown at D, and an air-chamber, as shown at $c'$, and openings from the air chamber into the case. For convenience of construction we have made it in two parts—viz., the dome-like disk $c^2$, including the hollow journal D, and the plain circular plate $c^3$, these parts being held together by suitable bolts or rivets; or it may be cast as a whole by the ordinary modes of casting. The hollow journal passes through the external case and has a journal-bearing therein.

The circular-plate part $c^3$ has a number of holes made through it in order to admit the air from the air-chamber $c'$ directly into the case; or distributing air-tubes may be connected with the head, as shown at F, in order the more thoroughly to distribute the air into all parts of the case. The double head may be used to advantage with or without these distributing air-pipes. If the air pipes are not used, the double head, being constantly revolving, will distribute the air through the cylinder in constantly-gyrating currents, and thereby the air will more thoroughly permeate and mix with the grain than if forced in through a stationary aperture; but in practice we prefer to use the distributing air-pipes. The open ends of these pipes connect with the double head in such a manner as to receive the air from the air-chamber, while the opposite or closed ends connect with the plain circular plate or head E. There may be twelve or more or less of these pipes, and they are placed parallel with each other and parallel with the case. The diameter of the heads is nearly equal to the inside diameter of the case A, and the tubes or pipes are about four inches in diameter, and are of sufficient length to place the heads a distance apart nearly equal to the length of the case, so that when put into the case the heads tubes, and buckets will nearly fill the case, except the spaces between, and revolve freely therein. The pipes are so connected to the heads in respect to their perforations that the blast of air therefrom will be toward the center of the case.

If the case should be made fifteen or more feet in length, the double head with air-chamber should be used at both ends, in order to insure the introduction of a sufficient quantity of air to meet the increased demand in consequence of the increased length of the case. When the length is carried to fifteen or more feet, it would be proper to introduce bridges or truss-work to support the air-tubes and buckets between the heads. The head E is a plain circular plate, and is keyed onto the shaft H. The shaft H runs through and connects with the double head, as shown at $h'$, and it projects through the end of the outside case, as shown at $h^2$, for the purpose of attaching gearing thereto.

At I, Fig. II, is represented a series of buckets of equal length with the tubes, and lying parallel with the tubes, and connected at one end to the double head and at the other end to the plain head E. They may receive additional support from truss-work, or from braces running up from the central shaft, H. These buckets are for the purpose of scooping or dipping up the grain from the bottom of the case. They revolve in close proximity to the inner circumference of the case, so as to dip up the grain and carry it up until the revolution causes it to slide off and fall down in shower, striking upon the tubes, bounding and falling again to the bottom, to be again picked up by the buckets and showered, as before. By this means the grain is kept constantly in motion, is stirred up and scattered and showered in a manner to admit the air at a great degree of heat without scorching. The grain also in the operation becomes scoured and cleaned. The chaff and dust passing up with the evaporation are driven out at the opening $a'$ at the top with the escaping air.

At $g$ is shown a dome like projection from the circular plate $c^3$ within the air-chamber, against which the current of air from the hollow journal strikes, and is deflected by it to the open ends of the distributing air-tubes.

J represents a furnace for heating the air. This may be of any convenient and well-known construction.

K represents a blower for forcing hot air from the furnace into the double head, and from thence through the distributing air pipes into the midst of the grain in the external case.

We make no claim either to the blower or the furnance.

L is a pipe which conducts the air from the furnace to the hollow journal of the double head.

M is a movable sleeve which is used to form and complete the connection between the air-pipe L and hollow journal D.

N is a smoke-pipe from the furnace.

P represents hinges which connect the two parts of the external case.

Operation: The several parts of our improved grain-drier being constructed and arranged substantially as herein described, the grain to be dried is spouted into the external case or shell through the opening at the top at the upper end of the case, as herein described, and falls upon the pipes and buckets. The revolution of these will keep the grain in constant motion, rising, falling, and showering, as before described, so that heated air at a very high degree may be used. The tubular or hollow journal D will allow the air to pass in while the double head, air-pipes, and buckets are in rapid motion, and the air-chamber $c'$, being in connection with the perforated pipes F, will distribute the air in small jets or currents through the perforations, so as to thoroughly mix with and permeate the showering grain and dry and "cure" the same in a very short time and in the most satisfactory manner. Two, three, or more of these driers may be connected together in a manner to run the grain from one to the other. When this is done, a blast of cold air may be used in the latter one for cooling the grain immediately after it is dried. In case grain becomes heated in the "bins," it may be run through the drier, and be thereby restored to its original condition.

Corn, wheat, and other grains should in all cases be run through the driers before being shipped to a foreign market, for it not only prevents the grain from "heating," but it also preserves it and improves its quality.

What we claim as our invention, and desire to secure by these Letters Patent, is—

The double head C, having an air-chamber, $c'$, and hollow journal D, for the purposes and substantially as herein described.

MORTIMER C. COGSWELL.
ADDISON G. WILLIAMS.

Witnesses:
E. B. FORBUSH,
E. OSBORNE.